Figure 1:
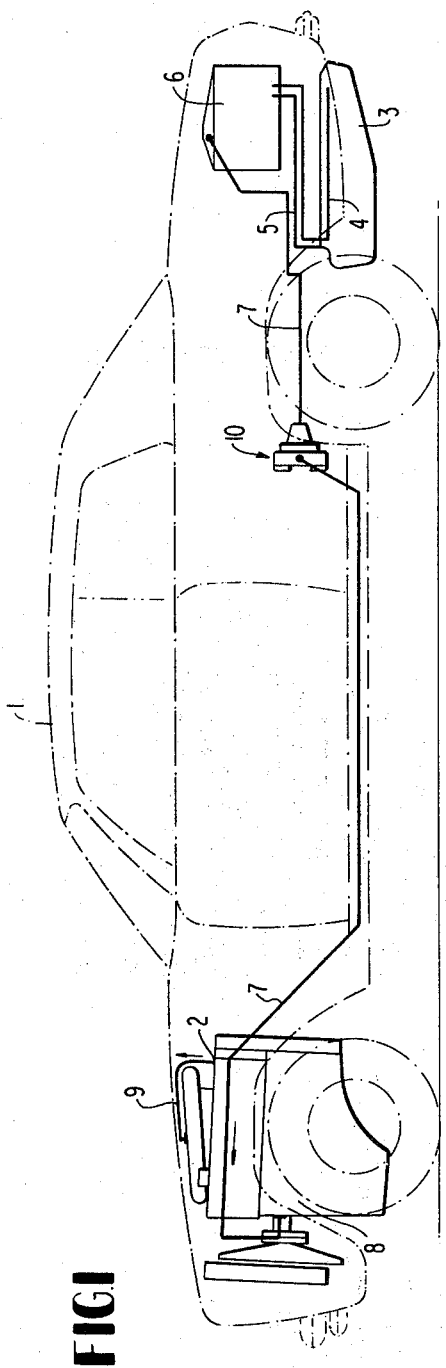

United States Patent [19]

Fiedler et al.

[11] 3,769,952

[45] Nov. 6, 1973

[54] INSTALLATION FOR VENTING A FUEL TANK OF A MOTOR VEHICLE PROVIDED WITH EXPANSION TANK

[75] Inventors: Horst Fiedler; Ludwig Fricker, both of Stuttgart; Willi Renz, Scharnhausen, all of Germany

[73] Assignee: Daimler-Benz Aktiengesellschaft, Stuttgart-Untertuerkheim, Germany

[22] Filed: Jan. 19, 1972

[21] Appl. No.: 219,027

[30] Foreign Application Priority Data
Nov. 16, 1971 Germany............ P 21 56 828.5

[52] U.S. Cl.............................. 123/136, 137/493.8
[51] Int. Cl............................................ F02m 21/02
[58] Field of Search................ 123/186; 139/493.8; 251/61.1

[56] References Cited
UNITED STATES PATENTS

| 3,695,376 | 10/1972 | Fiedler et al........................ 123/136 |
| 3,616,783 | 11/1971 | La Masters......................... 123/136 |
| 1,918,807 | 7/1933 | Glab ................................ 137/493.8 |
| 2,351,874 | 6/1944 | Parker ............................. 137/493.8 |
| 3,302,658 | 2/1967 | DeFrees........................... 123/136 |
| 3,517,654 | 6/1970 | Sarto................................ 123/136 |

Primary Examiner—Laurence M. Goodridge
Assistant Examiner—Cort Flint
Attorney—Paul M. Craig, Jr. et al.

[57] ABSTRACT

An installation for the venting and pressure relief of a fuel tank for an internal combustion engine equipped with an expansion tank, in which the fuel tank is connected by means of a line with the expansion tank, and which includes within a housing a vent valve, a safety valve and a pressure relief valve; the pressure relief valve selectively opens or closes a connection between the expansion tank and the inlet of the internal combustion engine; the housing of the installation includes an annular space in communication on one side with a connecting stub adapted to be connected with the expansion tank while the other side of the annular space is in communication with the vent valve; this annular space is also connected with two further annular spaces that are disposed axially offset to both sides of the stub connection; one of the further annular spaces is connected with the atmosphere by way of a valve opening which s controlled by the safety valve while the other further annular space is connected with the line leading to the internal combustion engine by way of a valve opening which is controlled by the pressure relief valve.

23 Claims, 3 Drawing Figures

PATENTED NOV 6 1973 3,769,952

SHEET 1 OF 2

INSTALLATION FOR VENTING A FUEL TANK OF A MOTOR VEHICLE PROVIDED WITH EXPANSION TANK

The present invention relates to an installation for the venting and pressure relief of a fuel tank provided with an expansion tank of an internal combustion engine, which fuel tank is connected with the expansion tank by means of a line and which within a housing includes a vent valve, a safety valve and a pressure relief valve which by means of a line selectively opens or closes a connection between the expansion tank and the inlet of the internal combustion engine, possibly by interconnection of the crankcase of the internal combustion engine and of a crankcase vent or breather system or under interconnection of a reservoir with a filter.

The present invention is concerned with the task to so construct an installation of this type that, on the one hand, an inexpensive manufacture and favorable arrangement is possible and that, on the other hand, simultaneously therewith also a high operating safety together with low trouble or failure incidence is achieved.

The underlying problems are solved according to the present invention in that the housing of the installation includes an annular space to which is connected in the center longitudinal axis on one side thereof an axial connecting stub adapted to be connected with the expansion tank and to which is connected coaxially thereto at the other side the vent valve; the annular space is further connected with two axially offset annular spaces disposed on a diameter through the annular space and to both sides of the axial connecting stub, of which one annular space is connected with the atmosphere by way of a valve opening controlled by the safety valve and of which the other annular space is connected with the line leading to the internal combustion engine by way of a valve opening controlled by the pressure relief valve.

By means of the construction of the installation in accordance with the present invention a compact assembly is attained and an inexpensive manufacture is realized.

In an advantageous embodiment of the subject matter of the present invention, the annular spaces provided with the valve openings may be closed by covers which serve for the guidance of the valves controlling the valve openings (safety valve and pressure relief valve) and for the arrangement of the valve springs closing these valves.

For purposes of achieving a higher operational reliability, the safety valve and the pressure relief valve may be constructed as diaphragm valves whereby both valves may be provided with rubber diaphragms, valve disks and valve springs interchangeable with one another in order to thereby reduce the number of different individual parts.

The covers for the guidance of the valves and for the accommodation of the valve springs may be constructed essentially hat-shaped and the cover for the presure relief valve may be larger in the axial direction of the valve than the cover for the safety valve so that a smaller prestress results for the valve spring of the pressure relief valve.

In order to prevent an incorrect installation of the covers during the assembly, one of the covers and correspondingly the housing may be provided with a projecting pin and with an aperture.

In order that a safe functioning of the valves is assured, the covers may be provided with pressure equalization apertures.

The valve openings for the safety valve and the pressure relief valve may include ring-shaped valve seats and the diameter of the valve seat for the pressure relief valve may be constructed smaller than the diameter of the valve seat for the safety valve. As a result thereof, differently large pressure actuated surfaces are obtained thereby for the required opening pressures for the valves.

The vent valve may consist in a simple manner of a valve body of rubber with a mushroom-shaped head and the head may be arranged with prestress to close off the valve opening.

An interchangeable filter may be connected upstream of the valve opening of the venting valve whereby the valve opening of the safety valve can be advantageously connected with this filter by way of a line.

For the arrangement in a motor vehicle, means may be provided at the housing of the valves, by means of which it is adapted to be secured at an outer wall of the motor vehicle in such a manner that a spacing remains always between the filter and the outer wall.

In a favorable manner the housing of the installation may consist of any suitable synthetic material, for example, of any known plastic material such as any conventional synthetic resinous material.

Accordingly, it is an object of the present invention to provide an installation for the venting and pressure relief of a fuel tank equipped with an expansion tank of an internal combustion engine which avoids by simple means the aforementioned shortcomings and drawbacks encountered in the prior art.

Another object of the present invention resides in a venting and pressure relief system for a fuel tank equipped with an expansion tank of an internal combustion engine which permits a relatively inexpensive manufacture and a favorable, space-saving arrangement accompanied with high operational reliability.

A further object of the present invention resides in an installation of the aforementioned type for the fuel tank of an internal combustion engine of a motor vehicle which utilizes relatively few individual parts, minimizes the number of component parts and permits ready interchange of the various components for the different valves.

Another object of the present invention resides in an installation for the venting and pressure relief of a fuel tank equipped with an expansion tank of an internal combustion engine in which the required prestress for the valve springs is automatically realized by different prestresses even though identical springs are used.

Figure 3:
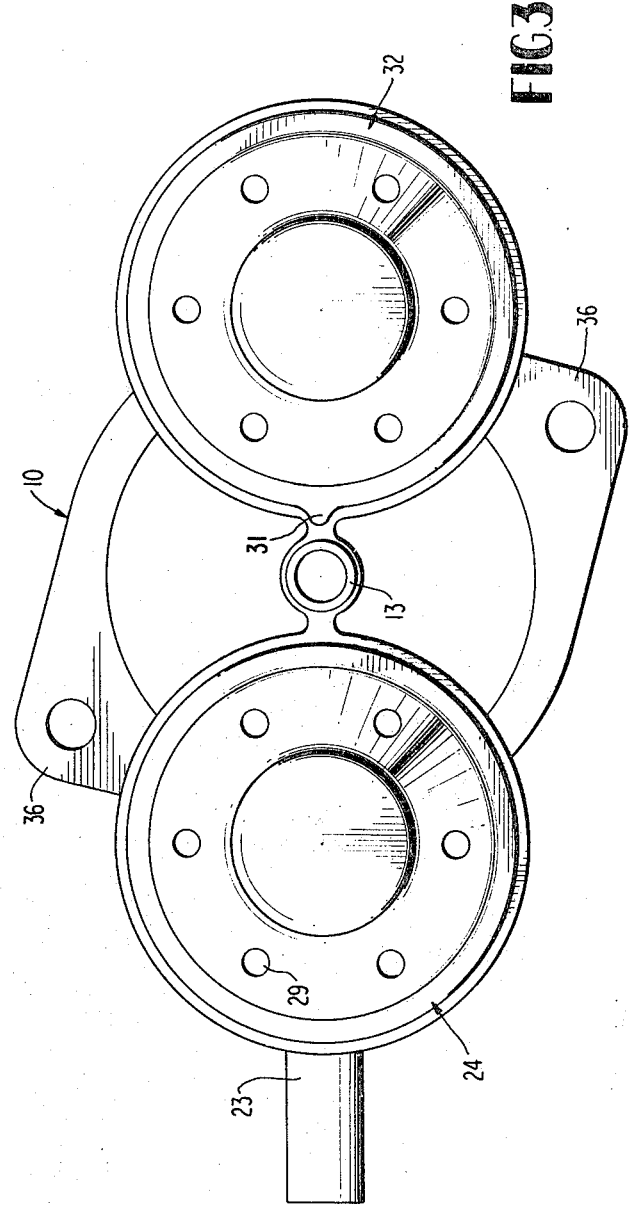
Figure 2:
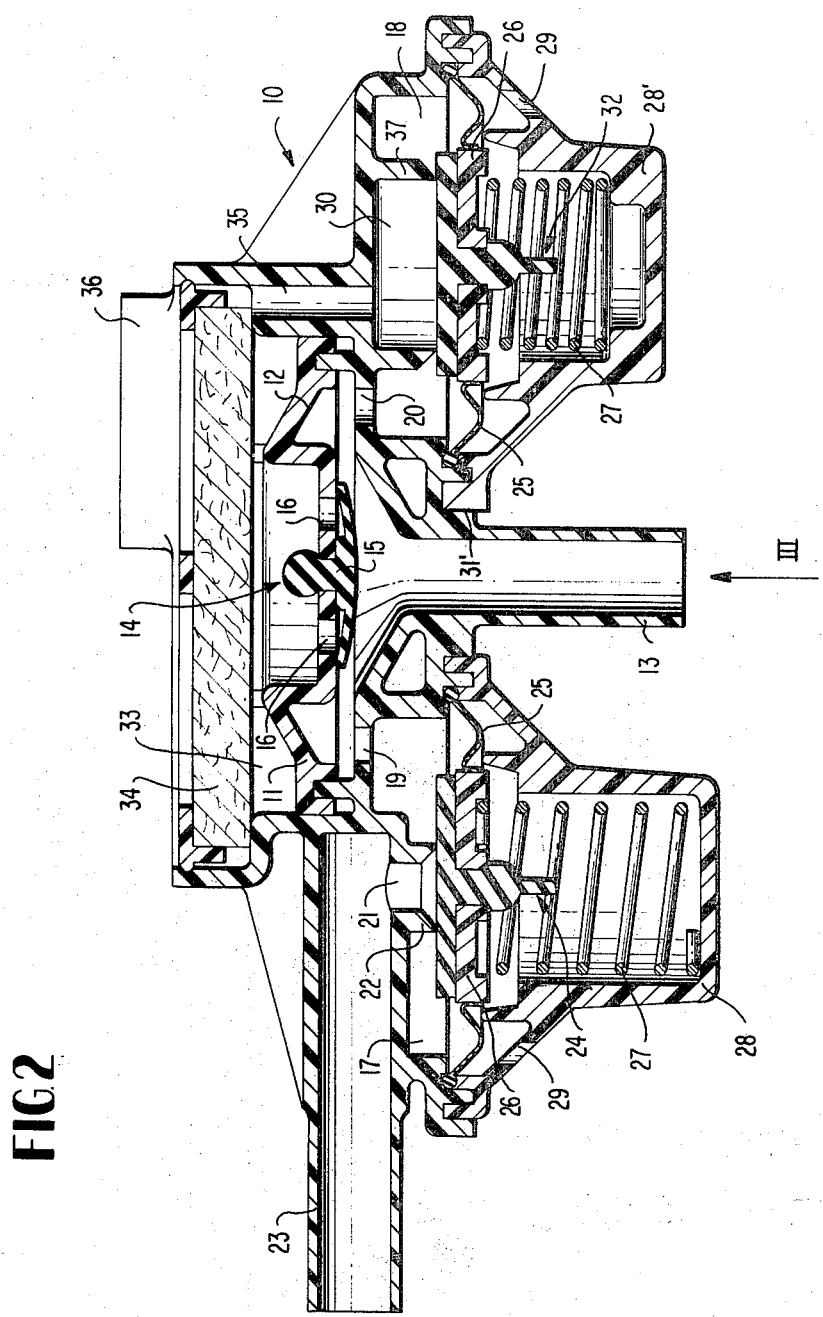

These and further objects, features and advantages of the present invention will become more apparent from the following description when taken in connection with the accompanying drawings which show, for purposes of illustration only, one embodiment in accordance with the present invention and wherein FIG. 1 is a somewhat schematic side view of a motor vehicle with a fuel tank, an expansion tank and a venting installation in accordance with the present invention, FIG. 2 is a cross sectional view through the installation for the venting and pressure relief in accordance with the present invention, and FIG. 3 is an elevational view of the installation taken in the direction of arrow III of FIG. 2.

Referring now to the drawing wherein like reference numerals are used throughout the various views to designate like parts, and more particularly to FIG. 1, a motor vehicle 1 is equipped with a fuel tank 3 for the supply of its drive internal combustion engine 2 with fuel, which fuel tank is connected by way of lines 4 and 5 with an expansion tank 6. The expansion tank 6 is connected by way of a line 7 with the crankcase 8 of the internal combustion engine 2, which is connected with the air filter of the internal combustion engine by means of a line 9 serving as crankcase breather or vent system. The line 7 may also lead directly to the inlet or intake of the internal combustion engine 2 and a filter, for example, a charcoal filter can be connected into this line. The line 7 is so installed that it adjoins the crankcase 8 extending downwardly (FIG. 1).

According to FIG. 1, an installation generally designated by reference numeral 10 for the venting and pressure relief of the expansion tank 6 and therewith of the fuel tank 3 is arranged in the line 7.

As can be seen more clearly from FIGS. 2 and 3, the installation 10 consists of a housing 11, in which is provided an annular space 12. An axial stub connection 13 is arranged in the center longitudinal axis of this annular space 12 at one side thereof, which will be connected with the section of the line 7 (FIG. 1) that leads to the expansion tank 6 (FIG. 1). A vent or breather valve generally designated by reference numeral 14 is provided on the other side of the annular space 12 coaxial to the connectin stub 13, which essentially consists of a valve body 15 made from rubber and secured in the housing 11, whose mushroom-shaped head portion is disposed in front of and abuts with prestress at the valve openings 16 arranged along a circle.

Offset below the annular space 12 and to both sides of the stub connection 13 are provided two further annular spaces 17 and 18 disposed on a diameter extending through the annular space; the further annular spaces 17 and 18 are thereby connected with the annular space 12 by way of apertures 19 and 20. The annular space 17 is provided with a valve opening 21 which is delimited by a circularly shaped valve seat 22 and which is continued in a connecting stub 23 projecting from the housing 12. The connecting stub 23 is connected with the section of the line 7 (FIG. 1) that leads directly or indirectly to the inlet of the internal combustion engine 2 (FIG. 1). The valve opening 21 (FIG. 2) is controlled by the pressure relief valve generally designated by reference numeral 24 which consists of a rubber diaphragm 25, of a valve disk 26, of a valve spring 27, and of an approximately hat-shaped valve cover 28. Along its outer circumference the rubber diaphragm 25 is clamped in between the valve cover 28 and the housing 12. On its inside the valve cover 28 is so constructed that the valve disk 26 and the valve spring 27 can be guided therein. The valve cover 28 is further provided with pressure equalization apertures 29.

The annular space 18 is provided with a valve opening 30 which is delimited by a ring-shaped valve seat 31 and which is controlled by the safety valve generally designated by reference numeral 32. The safety valve 32 consists of the same parts as the pressure relief valve 24. Different is only the fact that the valve cover 28' of the safety valve 32 has a smaller height so that the valve spring 27 thereof is more strongly prestressed, that the ring shaped valve seat 37 is larger in diameter than the valve seat 22, and that projections 31 and corresponding apertures 31' at the valve cover 28' and at the housing 11 are provided in order that the valve covers cannot be erroneously interchanged.

The valve openings 16 of the vent valve 14 lead to a space 33 within the housing 11 which is closed off against the outside by an interchangeable filter body 34.

A line 35 leads from the valve opening 30 of the safety valve 32 through the space 33 up to in front of the filter body 34.

Projections 36 (FIGS. 2 and 3) are provided at the housing 11 for securing purposes, which assure that the free atmosphere has admission to the filter body 34 when the installation is secured at an outer wall, for example, of a motor vehicle body.

The vent valve 14 responds to a vacuum within the range of about 0.002 to about 0.011 (atmospheres vacuum pressure, the safety valve 32 to a pressure within the range of about 0.05 to about 0.08 atmospheres excess pressure and the pressure relief valve 24 to a pressure within the range of about 0.015 to about 0.035 atmospheres excess pressure.

In case of an excess pressure in the fuel tank 3 and in the expansion tank 6 an excess pressure also prevails in the annular space 12 which keeps the vent valve 14 closed and opens the pressurje relief valve 24 so that gases can escape in the direction toward the inlet of the internal combustion engine 2. If the excess pressure increases above a certain value which might become dangerous to the entire installation the safety valve 32 additionally opens so that gases can also escape into the free atmosphere. In case of a vacuum in the annular space 12, the pressure relief valve 24 and the safety valve 32 remain closed whereas the vent valve 14 now opens.

In lieu of the arrangement illustrated in FIG. 1, according to which the installation 10 is connected with the crankcase 8 of the internal combustion engine and by way of the latter with the air filter of the internal combustion engine, the installation 10 can also be connected to a reservoir or tank in which may be possibly arranged a filter, and this reservoir may be connected with the air filter or directly with the inlet of the internal combustion engine.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. An installation for the venting and pressure relief of a fuel tank of an internal combustion engine equipped with an expansion tank in which the fuel tank is connected by way of a line with the expansion tank, and which includes within a housing means a vent valve means, a safety valve means and a pressure relief valve means that selectively opens or closes a connection between the expansion tank and an inlet of the internal combustion engine by way of line means, characterized in that the housing means is provided with a first space means, to one side of which is connected a connecting means adapted to be connected with the expansion tank and to which is connected on the other side thereof the vent valve means, said first space means being in communication with two further space means offset and disposed to both sides of the connecting means of the first space means, one of said further space means being connected with the atmosphere by way of a valve opening controlled by the safety valve means and the other further space means being adapted to be connected with the line means leading to the internal combustion engine by way of a valve opening contorlled by the pressure relief valve means, said safety valve means and said pressure relief valve means are constructed as diaphragm valves both provided with elastic diaphragms and valve disks of identical configurations and with valve springs having identical spring characteristics, and cover means are provided for said safety valve means and said pressure relief valve means, said cover means for said safety valve means provided with means for establishing a greater prestress in the valve spring thereof than in the valve spring of said pressure relief valve means.

2. An installation according to claim 1, characterized in that said first and further space means are substantially annular spaces, the connecting means in the form of a connecting stub being connected to the first annular space substantially coaxially thereto, said vent valve means being disposed also substantially coaxially to said first annular space, and said further annular spaces being disposed on a diameter through the first annular space and axially offset thereto on both sides thereof.

3. An installation according to claim 2, characterized in that the pressure relief valve means is connected with the inlet of the internal combustion engine by interconnection of its crankcase and a crankcase vent means.

4. An installation according to claim 2, characterized in that the pressure relief valve means is connected with the inlet of the internal combustion engine by interconnection of a reservoir having a filter.

5. An installation for the venting and pressure relief of a fuel tank of an internal combustion engine equipped with an expansion tank in which the fuel tank is connected by way of a line with the expansion tank, and which includes within a housing means a vent valve means, a safety valve means and a pressure relief valve means that selectively opens or closes a connection between the expansion tank and an inlet of the internal combustion engine by way of line means, characterized in that the housing means is provided with a first space means, to one side of which is connected a connecting means adapted to be connected with the expansion tank and to which is connected on the other side thereof the vent valve means, said first space means being in communication with two further space means offset and disposed to both sides of the connecting means of the first space means, one of said further space means being connected with the atmosphere by way of a valve opening controlled by the safety valve means and the other further space means being adapted 7 be connected with the line means leading to the internal combustion engine by way of a valve opening controlled by the pressure relief valve means, said further space means provided with the valve openings are closed off by cover means which serve for the guidance of the valve means controlling the valve openings and for the accommodation of valve springs closing said valve means, said safety valve means and said pressure relief valve means are constructed as diaphragm valves provided with elastic diaphragms, valve disks and valve springs interchangeable with each other, and said cover means for the guidance of the valve means and for the accommodation of the valve springs are constructed essentially hat shaped and the cover means for the pressure relief valve means is larger in the axial direction of the valve means than the cover means for the safety valve means.

6. An installation according to claim 5, characterized in that one of the cover means and correspondingly the housing means are provided with a projecting pin and an aperture, respectively, which preclude the assembly of the other cover means.

7. An installation according to claim 6, characterized in that the cover means are equipped with pressure equalization apertures.

8. An installation according to claim 7, characterized in that the valve openings for the safety valve means and the pressure relief valve means include ring-shaped valve seats and the diameter of the valve seat for the pressure relief valve means is smaller than the diameter of the valve seat for the safety valve means.

9. An installation according to claim 8, characterized in that the vent valve means consists of a valve body of rubber-like material having a substantially mushroom-shaped head portion and in that the head portion closes off the valve opening with prestress.

10. An installation according to claim 9, characterized in that an interchangeable filter is connected upstream of the valve opening of the vent valve means.

11. An installation according to claim 10, characterized in that the valve opening of the safety valve means is connected by way of a line with the filter connected upstream of the valve opening of the vent valve means.

12. An installation according to claim 11, arranged in a motor vehicle, characterized in that means are provided at the housing means for securing the same at an external wall of the motor vehicle in such a manner that a spacing remains between the filter and the outer wall.

13. An installation according to claim 12, characterized in that the housing means consists of synthetic plastic material.

14. An installation according to claim 13, characterized in that said first and further space means are substantially annular spaces, the connecting means in the form of a connecting stub being connected to the first annular space substantially coaxially thereto, said vent valve means being disposed also substantially coaxially to said first annular space, and said further annular spaces being disposed on a diameter through the first annular space and axially offset thereto on both sides thereof.

15. An installation according to claim 1, characterized ib that the cover means are constructed essentially hat shaped.

16. An installation according to claim 1, characterized in that one of the cover means and correspondingly the housing means are provided with a projecting pin and an aperture, respectively, which preclude the assembly of the other cover means.

17. An installation according to claim 1, characterized in that the cover means are equipped with pressure equalization apertures.

18. An installation according to claim 1, characterized in that the valve openings for the safety valve means and the pressure relief valve means include ring-shaped valve seats and the diameter of the valve seat for the pressure relief valve means is smaller than the diameter of the valve seat for the safety valve means.

19. An installation according to claim 1, characterized in that the vent valve means consists of a valve body of rubber-like material having a substantially mushroom-shaped head portion and in that the head portion closes off the valve opening with prestress.

20. An installation according to claim 1, characterized in that an interchangeable filter is connected upstream of the valve opening of the vent valve means.

21. An installation according to claim 20, characterized in that the valve opening of the safety valve means is connected by way of a line with the filter connected upstream of the valve opening of the vent valve means.

22. An installation according to claim 20, arranged in a motor vehicle, characterized in that means are provided at the housing means for securing the same at an external wall of the motor vehicle in such a manner that a spacing remains between the filter and the outer wall.

23. An installation according to claim 1, characterized in that the housing means consists of synthetic plastic material.

* * * * *